United States Patent [19]

Breed

[11] 4,284,863
[45] Aug. 18, 1981

[54] VELOCITY CHANGE SENSOR

[75] Inventor: David S. Breed, Boonton, N.J.

[73] Assignee: Breed Corporation, Fairfield, N.J.

[21] Appl. No.: 37,524

[22] Filed: May 9, 1979

[51] Int. Cl.$^3$ .................. H01H 35/14; B60R 21/08
[52] U.S. Cl. ........................ 200/61.53; 200/61.45 R; 280/735
[58] Field of Search .................. 102/262, 263, 274; 280/735; 200/61.45 R, 61.53, 61.52

[56] References Cited

U.S. PATENT DOCUMENTS 3,974,350  8/1976  Breed .................. 102/262 X

*Primary Examiner*—J. V. Truhe
*Assistant Examiner*—Richard M. Moose
*Attorney, Agent, or Firm*—Learman & McCulloch

[57] ABSTRACT

A velocity change sensor adapted for mounting on a vehicle equipped with a passenger protective device, such as an inflatable air bag, comprises a body fitted with a normally open electrical switch connected to the passenger protective device's operating mechanism and adapted to be closed by a sensing mass upon movement of such sensing mass a predetermined distance in response to acceleration of the vehicle above a predetermined threshold. The sensing mass is biased to a normally inactive, initial position under a force which establishes the acceleration threshold. A biasing mass engages the sensing mass when the latter is in its initial position but moves out of engagement with the sensing mass in response to acceleration of the vehicle above the threshold level to permit movement of the sensing mass from its initial position toward its passenger protective device operating position. Movement of the biasing mass is damped to prevent rebounding of the biasing mass and consequent interference with movement of the sensing mass. Movement of the sensing mass also is damped to prevent operation of the passenger protective device except in those instances in which the acceleration and duration thereof are of such magnitude as to require operation of the protective device.

29 Claims, 6 Drawing Figures

VELOCITY CHANGE SENSOR

BACKGROUND OF THE INVENTION

One of the devices intended to protect a vehicle's occupant against injury is an instrumentality such as an inflatable airbag which is housed in the passenger compartment forwardly of the occupant in a deflated condition. When such vehicle is subjected to acceleration of the kind accompanying a crash, the airbag inflates to provide a protective cushion for the occupant.

When a moving vehicle becomes involved in a crash of such severity as to slow or stop the vehicle suddenly, an occupant of the vehicle will continue forward movement at the rate the vehicle was traveling at the time of the crash until such time as the occupant collides with some portion of the structure of the passenger compartment. If serious injury to the occupant is to be prevented, the airbag must be fully inflated before a collision occurs between the occupant and some structure of the passenger compartment. It has been found that, typically, the driver of a vehicle can move forwardly only about five inches from the driving position before a restraining device such as an airbag is needed to prevent injury. All airbag inflating mechanisms require a period of time, such as thirty milliseconds, to effect inflation of the airbag once a signal initiating inflation has been received from a sensor. Under these circumstances, an airbag protective device, to be effective, must become inflated thirty milliseconds before the occupant has moved five inches from the position he occupied at the time of the crash.

It has been determined that a passenger protective device is needed when the movement of the vehicle occupant relative to the vehicle is at a velocity of about twelve miles per hour. Thus, an ideal sensor is one which will determine that the occupant will collide with some portion of the vehicle's interior at a speed of twelve miles per hour or greater, and thirty milliseconds before the occupant has moved forwardly five inches.

Since an airbag protective device is one which is designed to prevent forcible collision between a vehicle occupant and some portion of the passenger compartment, it is important that the sensor which initiates operation of the airbag inflation mechanism be one which is responsive to the acceleration of the passenger compartment, rather than some other part of the vehicle. Not all crashes, however, result in acceleration of the vehicle's passenger compartment to a degree necessary to require operation of the airbag. For example, if a front fender or bumper of a vehicle should collide with a pole or the like which breaks upon or shortly after impact, a sensor mounted on the front fender or bumper could experience a velocity change of twelve miles per hour, or greater, before the pole breaks, whereas the passenger compartment of the vehicle might experience a negligible velocity change. Under these circumstances, inflation of the airbag would not be required and, if it were, it might even contribute to a subsequent accident. It is important, therefore, that the sensor or sensors with which a vehicle is equipped be located in such positions and be of such construction as to be predictive that the passenger compartment will undergo a velocity change necessitating passenger protection.

Frontal portions of the vehicle, i.e., bumpers, fenders, radiators, and the like, may undergo a substantial velocity change relative to the passenger compartment inasmuch as such frontal portions of a vehicle are capable of collapsing and absorbing energy. Thus, sensors mounted at frontal positions on a vehicle should have characteristics different from sensors mounted on its firewall, for example, in order to assure inflation of an airbag when required, but to avoid inflation of the airbag in those instances in which it is not necessary.

In those sensors which initiate inflation of an airbag via an electrical circuit which requires the closing for a finite period of time a normally open switch, care must be taken to ensure that the switch will remain closed, not only for the minimum time required to effect circuit completion, but also for a somewhat longer period of time so as to provide a factor of safety. In sensors which utilize a biasing mass to establish an acceleration threshold which must be exceeded before closing of the switch is possible, there is a likelihood that the biasing mass may move to a position in which the switch operating means is free to move toward switch closing position, but then rebound into the path of movement of the switch closing means and delay or prevent closing of the switch, or effect premature reopening of the switch. On the other hand, in some instances it may be desirable to delay closing of the switch for a predetermined period of time so as to avoid initiating operation of the airbag until sufficient time has lapsed to ensure that the circumstances necessitate airbag inflation.

Sensors constructed according to the invention are so designed as to enable them to be mounted in selected positions on a vehicle and sense velocity changes which require and do not require actuation of a passenger protective device.

SUMMARY OF THE INVENTION

A sensor constructed in accordance with the invention embodies many of the principles disclosed in U.S. Pat. No. 3,974,350, granted Aug. 10, 1976, and comprises a body adapted to be mounted on a vehicle or the like in a position to sense and respond to acceleration pulses. Within a tubular passage in the body is mounted an acceleration sensing mass formed of electrically conductive material. The sensing mass is movable in response to an acceleration pulse from an initial position along a path leading to a normally open switch that is connected via suitable wiring to the operating mechanism of an inflatable airbag.

Biasing means acts on the sensing mass to bias the latter to its initial position under a preselected force which must be exceeded before the sensing mass may move from its initial position. The biasing means includes a mass which normally engages and maintains the sensing mass in its initial position, but which moves out of engagement with the sensing mass in response to acceleration greater than the preselected biasing force, thereby freeing the latter for movement toward the switch. Movement of the sensing mass is fluid damped, either inertially or viscously. As thus far described, the apparatus disclosed herein is quite similar in function to that disclosed in the aforementioned patent.

Movement of the biasing mass in response to acceleration is along a linear path, but cooperable means carried by the body and the biasing mass damp movement of the latter by translating linear movement into rotary movement and dissipating some of the kinetic energy of the biasing mass. Dissipation of kinetic energy prevents rebounding of the latter into premature reengagement with the sensing mass. The means for translating linear movement of the biasing mass into rotary movement may also function to delay movement of the sensing mass into engagement with the switch.

Figure 1:
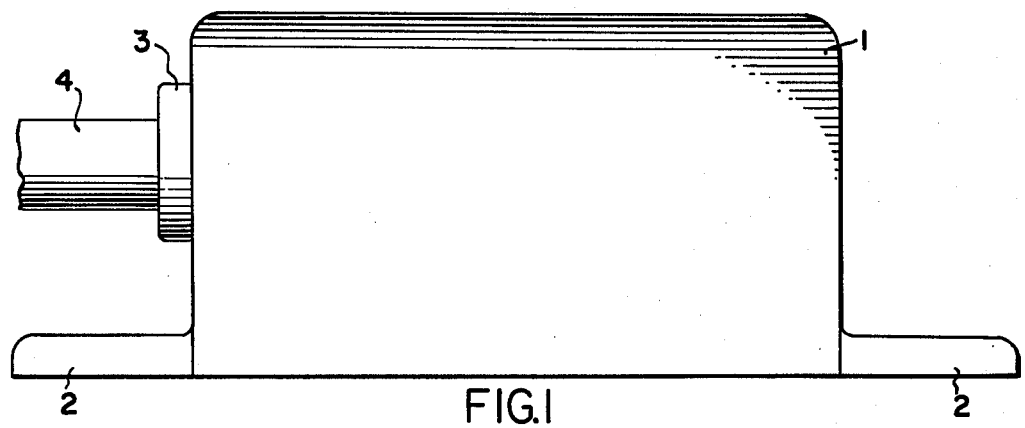
FIG. 1 is an enlarged, elevational view of a casing or housing within which a sensor constructed in accordance with the invention is contained.

A sensor constructed in accordance with the invention is adapted to be enclosed within a sturdy casing or housing 1 having flanges 2 provided with openings for the accommodation of screws or the like (not shown) to mount the housing at a suitable location on and relative to the longitudinal axis of a vehicle. A bushing 3 fits within and closes an opening formed in the housing 1 and accommodates an insulated cable 4 containing electrical wiring to be described hereinafter. The housing 1 has a cavity therein for the accommodation of a sensor.

A sensor constructed according to the embodiment shown in FIGS. 2-5 comprises a cylindrical body 5 formed of electrically insulating material. The body 5 has a bore 6 closed at one end by a wall 7 provided with a pair of diametrically opposed openings 8 therein which communicate with the bore 6. The opposite end of the bore 6 is open. Adjacent the closed end of the bore the latter is provided with a pair of longitudinally extending diametrically opposed ribs 9 each of which has a groove 10 therein.

Fitted into the bore 6 and seated against the end wall 7 is an elongate sleeve 11 having a cylindrical bore 12 extending therethrough. The sleeve 11 is longer than the body 5 and that part of the sleeve which extends into the bore 6 has diametrically opposed, radially projecting ribs 13 that are fitted into the grooves 10 to preclude rotation of the sleeve 11 relative to the body 5.

Accommodated in the bore 12 and seated at one end against the end wall 7 is a biasing spring 14 having a predetermined capacity. Also accommodated in the bore 12 is a biasing mass 15 having a predetermined weight and comprising a preferably metallic body 16 that is both slidably and rotatably received in the bore 12. The body 16 terminates at one end in a reduced diameter extension 17 fitted into the spring 14 and which forms a shoulder 18 against which the spring 14 seats. The opposite end of the body 16 also terminates in an elongate, reduced diameter extension 19 fitted at its free end with an electrically insulative cap 20.

That end of the sleeve 11 which projects beyond the body 5 terminates in an annular outer skirt 22. Adjacent the skirt is a reduced diameter, annular neck 23 that is accommodated in the bore 6. The skirt 22 is threaded to accommodate a correspondingly threaded plug 24 having an annular groove 25 therein in which is fitted a preferably glass cylinder 26 forming a tubular bore or passage 27 having a smooth surface. The cylinder 26 extends inwardly of the sleeve 11 and beyond the plug a distance sufficient to be received in and supported by the neck 23.

Accommodated in the bore 27 of the cylinder 26 is a preferably spherical sensing mass 29 formed of an electrically conductive, low expansion metal. The mass 29 normally seats on a semi-spherical surface 30 formed at the inner end of the plug 24. A spherical mass is preferred to a cylindrical mass, for example, because a spherical mass can roll and thus is much less susceptible to friction forces, and also because a cylindrical mass can cock causing major changes in fluid flow resistance. Both of these effects give rise to erratic behavior.

Figure 2:
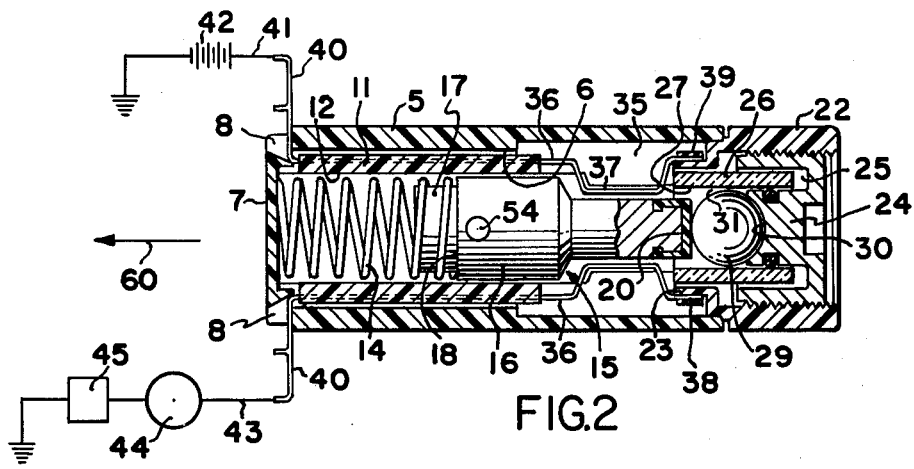
FIG. 2 is a horizontal sectional view of a sensor constructed in accordance with one embodiment of the invention.
Figure 3:
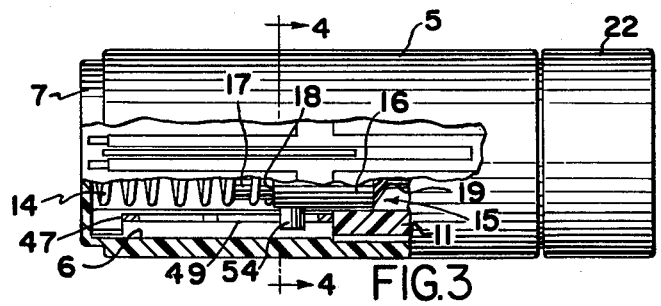
FIG. 3 is a side elevational view, partly broken away, of the sensor shown in FIG. 2.
Figure 4:
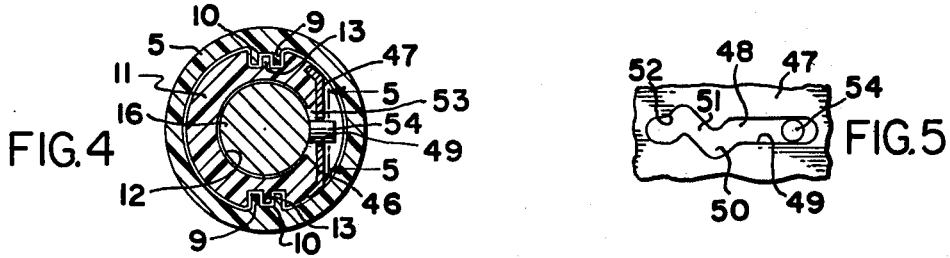
FIG. 4 is a sectional view taken on the line 4—4 of FIG. 3.
Figure 5:
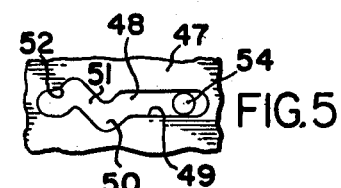
FIG. 5 is an elevational view of a detail as viewed in the direction of the arrows 5—5 of FIG. 4.

In the embodiment shown in FIG. 2, the diameters of the bore 27 and of the mass 29 are chosen to establish a clearance 31 between them of such size as to provide for inertial flow of fluid (air or other gas) through the clearance for the purposes of damping movement of the mass relative to the cylinder. Such inertial fluid flow results in a sensor having a high velocity change for short duration pulses and thus provides additional protection against inadvertent actuation of a passenger restraining device due to short lived pulses caused by breakaway poles or hammer blows, for example.

Between its ends the sleeve 11 is provided with a pair of diametrically opposed slots 35 for the accommodation of electrically conductive switch blades 36 having bowed contact portions 37 spaced apart from and confronting one another and forming normally open contacts. The blades 36 have corresponding free ends 38 at one end of the slots 35 which rest upon the neck 23 of the sleeve 11. Encircling the ends 38 of the contact blades is an elastic band 39 which yieldably maintains the ends of the conductive blades against the neck. Adjacent the opposite end of the slots 35 the conductive blades extend through the grooves 10 and end in terminals 40 which project through the opening 8. One of the terminals 40 is adapted for connection by a conductor 41 to ground through an energy source such as a battery 42, and the other terminal 40 is adapted for connection by a conductor 43 to an operator 44 of known construction that is operable to activate a passenger restraining instrumentality 45 such as an inflatable airbag. The terminals 40 are flexible and may be bent from the positions shown in FIG. 2 so as to extend through the bushing 3 and be connected to the conductors 41 and 43 which are within the cable 4.

At least one side of the sleeve 11 is provided with a flattened surface 46 that is substantially tangential to the inner surface of the bore 12. Fixed to the flattened surface 46 is a plate 47 in which is formed a slot 48. The slot has a linear portion 49 which extends longitudinally of the bore 12 and communicates with a plurality of sinuous or zig-zag slot portions 50, 51, and 52. In the disclosed embodiment, the slot portion 50 extends at an angle of about 45° from the slot portion 49, the portion 51 extends at an angle of about 90° to the portion 50, and the slot portion 52 extends at an angle of about 90° to the slot portion 51. The angularity of the slot portions may be different from that specified.

The sleeve 11 is provided with an elongate, linear slot 53 of greater width than that of the slot 49 and extending parallel to the longitudinal axis of the bore 12. The slot 53 communicates with the bore 12.

Fixed to the biasing mass 16 and projecting laterally therefrom through the slot 53 and into the slot 49 is a pin 54. The pin 54 is slidable longitudinally of the slot 49 and is capable of following the sinuous path formed by the slot portions 48-52. Since the body 16 is rotatable as well as linearly movable within the bore 12, movement of the pin 55 longitudinally of the slot 49 will cause the body to be oscillated according to the path defined by the slot 49. The slot 49 and the pin 54 constitute means for damping movements of the biasing mass 16.

Figure 6:
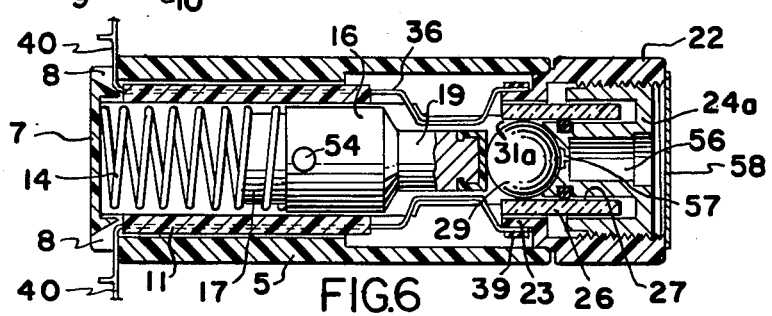
FIG. 6 is a view similar to FIG. 2, but illustrating a modified form of the invention.

The embodiment of the invention shown in FIG. 6 is the same as that described earlier, except for the differences noted below.

The plug 24a (corresponding to the plug 24) has a bore 56 in communication with a sharp edged orifice 57, thereby forming an air passageway through the plug 24a. The diameters of the bore 27 and the mass 29 are virtually the same, thereby limiting the clearance 31a between the bore 27 and the mass 29 to an amount just sufficient to enable movement of the mass within the bore and to minimize fluid flow between bore 27 and the mass 29. To minimize the possibility of the entry of foreign matter into the orifice 57, an air permeable membrane 58 is adhered to and covers the open end of the skirt 22.

OPERATION

To condition either of the two embodiments of sensors disclosed herein for operation, it is fitted into the cavity of the casing 1 and the terminals 40 connected to the conductors 41 and 43. The cavity within the casing 1 is of such size as to maintain the body 5 and the sleeve 11 in assembled relation. The casing then may be bolted or otherwise secured to some portion of a vehicle with the longitudinal axis of the sleeve 11 substantially parallel to the longitudinal axis of the vehicle. If the casing is mounted at some frontal portion of the vehicle, such as the bumper, a fender, or the radiator the characteristics of the sensor will be different from one that is mounted on the vehicle's firewall, as will be explained.

A sensor corresponding to that disclosed in FIG. 2 is adapted to be mounted on the firewall of a vehicle traveling in the direction of the arrow 60 (FIG. 2). Deceleration of the vehicle, if sufficiently abrupt, will subject the bias mass 16 and the sensing mass 29 to an acceleration pulse in the direction of the arrow 60. If the acceleration pulse is sufficient to overcome the force of the spring 14 the bias mass 16 will move in the direction of the arrow 60, thereby disengaging the sensing mass 29 so as to enable the latter also to move in the direction of the arrow 60. The capacity of the spring should be such that an acceleration pulse must exceed a predetermined threshold, such as 3 Gs, before the bias mass 16 is capable of moving relative to the sleeve 11. However, the capacity of the particular spring 14 selected may be varied to achieve optimum results.

If the acceleration pulse is of such magnitude as to enable the bias mass 16 to overcome the force of the spring 14, and is of sufficient duration, linear movement of the bias mass can be quite rapid, and could be sufficiently rapid to cause the mass to bottom on the wall 7 and rebound. In the present construction, however, unrestricted linear movement of the bias mass 16 may continue only until such time as the pin 54 reaches the angular slot portion 50, whereupon the mass 16 is forced to rotate in one direction as it continues to move toward the wall 7. As the pin 54 approaches the slot portion 51, such rotation of the mass 16 terminates and it is rotated in the opposite direction. In this manner the kinetic energy of the bias mass 16 is partially dissipated and movement of the mass is damped. It is possible that the bias mass 16 may be subjected to an acceleration pulse of such magnitude and duration that the mass will bottom on the wall 7 and rebound notwithstanding damping of its movement. In this event, rebounding movement of the mass also is damped by the cooperation of the pin 54 and the slot 48.

When the bias mass 16 is subjected to an acceleration pulse sufficient to effect disengagement of the latter from the sensing mass 29, the latter mass, being subjected to the same acceleration pulse, is enabled to move in the same direction as the bias mass 16. After slight movement of the sensing mass 29 off its seat 24, a partial vacuum is formed between the mass and the seat. A pressure differential thus is created across the sensing mass and produces a damping force which opposes further movement of the mass. Gradually, however, fluid will leak past the mass 29 at a rate that is determined by the size of the clearance 31. Preferably, the clearance is of such size as to provide for inertial flow of the fluid through the clearance 31, rather than viscous flow, and to provide the desired rate of longitudinal movement of the sensing mass as explained in the aforementioned patent.

If the acceleration pulse is of sufficient magnitude and duration, the mass 29 eventually will move to a position in which it bridges the contacts 37. The diameter of the mass 29 is greater than the spacing between the contacts 37 thereby assuring good contact between the blades and the mass 29 to effect closing of the switch thus formed by the blades and mass to actuate the mechanism 44 and inflate the airbag 45. To ensure against bouncing or rebounding of the blades 37 as they are engaged by the mass 29, the elastic band 39 imposes a yieldable force on the blades to restrain their separation and maintain them in firm engagement with the mass 29.

In the construction illustrated in FIG. 2, the length of the linear slot portion 49 is such that, by the time the mass 16 has moved a distance to enable the pin 54 to enter the slot portion 50, the bias mass also has moved a distance sufficient to enable the sensing mass 29 to engage and bridge the contacts 37. This is the arrangement preferred when the sensor is mounted on a vehicle's firewall.

If the sensor is to be mounted on an energy absorbing portion of a vehicle, such as the front bumper or fender, a slightly different relationship between the bias mass 16 and its damping means is preferred so as to delay initiation of the inflation of the airbag. This effect may be achieved by shortening the length of the linear slot portion 49, i.e., locating the first angular slot portion 50 closer to the initial position of the sensing mass 29. In such an arrangement damping of the movement of the bias mass 16 commences prior to the time that it is moved a distance sufficient to permit engagement of the mass 29 with the contacts 27. In such a construction the acceleration pulse not only must exceed the force of the spring 14, but also must be of sufficient duration to enable movement of the bias mass 16 a distance great enough to permit movement of the sensing mass 29 into engagement with the contacts 37. This arrangement makes it possible to distinguish between crashes necessitating deployment of the protective device and other, short duration pulses.

The operation of the sensor embodiment illustrated in FIG. 6 is quite similar to that of the previously described embodiment with the exception that, in the modified embodiment, movement of the sensing mass 29 is damped by restricting the flow of fluid to the space between the mass and the seat 30a by means of the sharp edged orifice 57. In the modified construction the clearance 31a between the mass 29 and the bore 27 is less than the clearance 31, and should be just sufficient to enable movement of the mass 29 relative to the cylinder 26, thereby assuring that the dominant damping influence on the mass 29 is attributable to the fluid. The flow characteristics of the fluid through the orifice preferably are inertial.

The ability to damp not only the movement of the sensing mass 29, but also the bias mass 16, coupled with the latter's ability to enable or disable free movement of the sensing mass 29 into engagement with switch contacts, permits sensors having greatly differing operating characteristics to be produced. Thus, sensors constructed in accordance with the invention are capable of operation regardless of whether they are mounted at frontal or rearward positions on a vehicle and are effective to sense the need for operation of a passenger protective device and initiate operation of such device in sufficient time to provide protection for a vehicle occupant.

The disclosed embodiments are representative of presently preferred forms of the invention, but are intended to be illustrative rather than definitive. The invention is defined in the claims.

I claim:

1. In a sensor construction adapted for mounting on a vehicle or the like having an instrumentality to be operated in response to acceleration of said vehicle above a predetermined threshold, said sensor having a body member provided with a tubular passage having a bore within which a sensing mass is mounted for movement in response to acceleration of said vehicle from an initial position toward a second position in which said sensing mass initiates operation of said instrumentality, and biasing means exerting a predetermined, yieldable force on said sensing mass restraining movement of the latter from said initial position until said predetermined force is overcome by acceleration whereupon said biasing means is movable relative to said body member and said sensing mass, the improvement comprising means responsive to and following movement of said biasing means a predetermined distance relative to said sensing mass for damping further movement.

2. A sensor construction according to claim 1 wherein said passage contains a fluid and wherein movement of said sensing mass is damped by said fluid.

3. A sensor construction according to claim 2 wherein said fluid is a gas.

4. A sensor construction according to claim 3 wherein said gas is air.

5. A sensor construction according to claim 1 wherein said passage contains a fluid and wherein there is a clearance between said bore and said sensing mass through which said fluid flows in response to movement of said sensing mass.

6. A sensor construction according to claim 1 wherein said passage contains a fluid and has an orifice in communication with said bore adjacent that end of the bore occupied by said sensing mass when the latter is in its initial position, said orifice providing a passageway for said fluid into said bore in response to movement of said sensing means from its initial position.

7. A sensor construction according to claim 1 wherein said sensing mass is spherical.

8. A sensor construction according to claim 1 wherein said sensing mass is formed of electrically conductive material.

9. A sensor construction according to claim 1 wherein said biasing means includes a mass member and wherein said damping means comprises cooperative means carried by said body member and said mass member for translating linear movement of the latter into rotary movement thereof.

10. A sensor construction according to claim 9 wherein said cooperative means comprises a slot in one of said members and a pin on the other of said members accommodated in said slot.

11. A sensor construction according to claim 1 including actuating means adapted for connection to said instrumentality and extending into said passage for engagement by said sensing mass in response to movement of the latter a predetermined distance from its initial position.

12. A sensor construction according to claim 11 wherein said actuating means comprises electrically conductive, normally open switch means engageable by said sensing mass.

13. A sensor construction according to claim 12 wherein said sensing mass is formed of electrically conductive material.

14. A sensor construction according to claim 12 wherein said switch means includes spaced apart contacts, the spacing between said contacts being less than the corresponding dimension of said sensing mass.

15. A sensor construction according to claim 12 including means yieldably urging said contacts toward one another.

16. In a sensor construction of the kind having a body member provided with a tubular passage having a bore within which a sensing mass is movable in one direction from an initial position in response to acceleration above a predetermined threshold of said body member in the opposite direction, a bias mass mounted in said body member for movement in response to said acceleration of the latter from a normal position in which it engages said sensing mass to a second position spaced from said sensing mass, and yieldable means yieldably urging said bias mass toward said normal position, the improvement comprising means responsive to and following movement of said bias mass a predetermined distance from said normal position for damping further movement of said bias mass toward said second position.

17. A sensor construction according to claim 16 wherein said damping means includes means effective to damp said movement of said bias mass only after the latter has moved toward said second position a distance sufficient to effect disengagement of said bias mass and said sensing mass.

18. A sensor construction according to claim 16 wherein said damping means is effective to damp movement of said bias mass in a direction from said second position toward said normal position.

19. A sensor construction according to claim 16 including means for damping movement of said sensing mass from said initial position.

20. A sensor construction according to claim 16 wherein said passage contains a fluid and wherein movement of said sensing mass is damped by said fluid.

21. A sensor construction according to claim 20 wherein said fluid is a gas.

22. A sensor construction according to claim 21 wherein said gas is air.

23. A sensor construction according to claim 16 wherein said damping means comprises cooperable means carried by said body and by said bias mass for retarding the rate of movement of the latter in a direction toward said second position.

24. A sensor construction according to claim 16 wherein said damping means comprises cooperable means carried by said body and by said bias means for translating linear movement of the latter into rotary movement.

25. A sensor construction according to claim 24 wherein said cooperable means comprises a pin accommodated in a slot.

26. A sensor construction according to claim 25 wherein said slot is formed in said body and said pin projects from said bias mass.

27. A sensor construction according to claim 25 wherein said slot has a first portion extending parallel to the direction of movement of said bias mass toward said second position and communicating with a second portion extending laterally of said first portion.

28. A sensor construction according to claim 27 wherein said slot has additional portions which define with said second portion a zig-zag path.

29. In a sensor construction adapted for mounting on a vehicle or the like having an instrumentality to be operated in response to acceleration of said vehicle above a predetermined threshold, said sensor having a body member provided with a tubular passage having a bore within which a sensing mass is mounted for movement in response to acceleration of said vehicle from an initial position toward a second position in which said sensing mass initiates operation of said instrumentality, a biasing mass in engagement with said sensing mass when the latter is in said initial position, and yieldable means exerting a predetermined force on said biasing mass urging the latter toward said sensing mass to maintain the latter in said initial position until said predetermined force is overcome by acceleration whereupon said biasing mass and said sensing mass are movable relative to one another and to said body member, the improvement comprising means responsive to and following movement of said biasing mass a predetermined distance relative to said sensing mass for damping such movement.

* * * * *